Jan. 13, 1970     S. T. WILLIAMS     3,489,166

TIRE VALVE

Filed July 3, 1968

INVENTOR
Selden T. Williams
BY Dallett Hoopes
ATTORNEY

United States Patent Office 3,489,166
Patented Jan. 13, 1970

3,489,166
TIRE VALVE
Selden T. Williams, Middlebury, Conn., assignor to Scovill Manufacturing Company, Waterbury, Conn., a corporation of Connecticut
Filed July 3, 1968, Ser. No. 742,240
Int. Cl. F16h *15/20*
U.S. Cl. 137—234.5       2 Claims

ABSTRACT OF THE DISCLOSURE

A tire valve has a core with a one-piece pin, the lower end of which removably mounts the valve washer. The washer, of resilient material, can be stretched over the lower end of the pin for removal. The washer is readily accessible upon removal of the core from the stem.

---

This invention relates to a tire valve. More specifically, the invention relates to a tire valve especially adapted for use on bicycle tires containing an inner tube.

An essential characteristic of the present valve is the ready accessibility of the valve washer for inspection, cleaning, and, if necessary, replacement. This feature is extremely desirable in a bicycle valve especially since such valves are frequently exposed to dust and dirt which may impair effective sealing.

Other features of the invention will be apparent from a reading of the following specification including the drawings, wherein.

Figure 1:
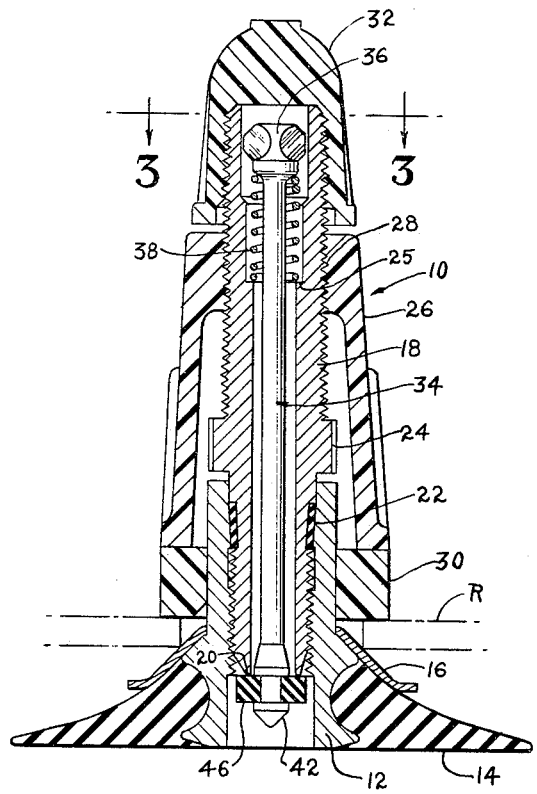
FIG. 1 is a sectional view showing a valve embodying my invention.
Figure 3:
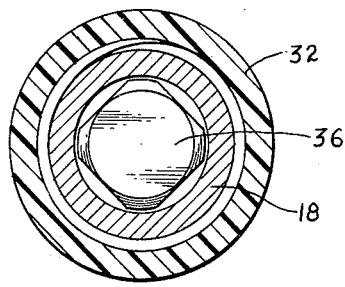
FIG. 3 is a sectional view taken on the line 3—3 of FIG. 1.

Referring more specifically to the drawings, a valve embodying the invention is generally designated 10 in FIG. 1. It comprises an internally threaded stem 12 to which is bonded in a conventional manner a rubber base 14. A washer 16 surrounds the stem above the rubber base and functions to keep the base in position on the outside of the rim R.

Threadingly engaging the inside of the stem 12 is the core body 18. As shown, the lower end of the body is tapered to provide a thin annular valve seat 20. Thereabove, the lower portion of the body is threaded so as to engage the stem. Above the lower threads, the body is formed with a peripheral groove receiving a sealing gasket 22 of resilient material and sealingly connecting the stem and body.

For purposes of hand tightening, the body bears intermediate its ends and annular enlargement 24 which may be knurled for better grip. Thereabove, the exterior of the body is threaded. Toward its upper end the center bore of the body is enlarged to present an upward annular shoulder 25.

Holding the body up in position is an inverted cup-shaped rim nut 26. The upper end of the rim nut is formed with a threaded central opening as at 28 which engages the threads on the body. The lower end of the nut engages the annular rim spacer 30, the underside of which may be contoured to match the upper surface of the rim R. When the rim nut is tightened, the core body 18 is held firmly in position. A filler cap 32 engages the upper end of the valve body in the conventional manner.

A one-piece valve pin 34 is disposed in the core body. At its upper end, the pin is formed with a rounded-off block-shaped head 36 which, engaging the wall of the upper end of the body 18, helps stabilize the position of the pin and still permits required flow of air. A conventional helical spring 38 surrounds the pin and engages the head 36 and shoulder 25 urging the pin upward.

The lower part of the pin extends downward from the lower end of the core body. It presents an annular enlargement 40 spaced upward from the lower end of the pin. The enlargement is formed with an upwardly inclined shoulder 40a which provides guide means for the pin in seating. The lower end of the pin is also enlarged and terminates downwardly in a tapered tip 42, the lower end and the annular enlargement defining between them a groove 44. The end and enlargement are of lesser diameter than the inside of the tubular core so that they may pass through the core in assembly.

Figure 2:
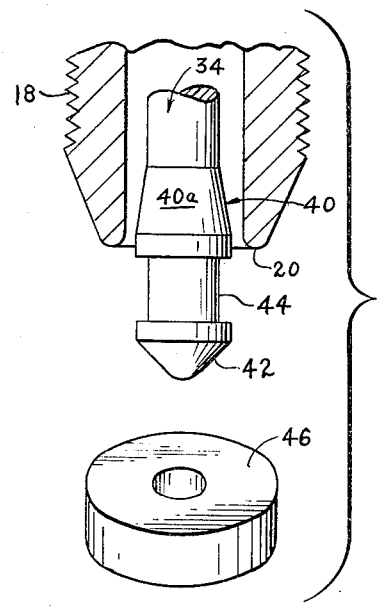
FIG. 2 is an enlarged fragmentary partly exploded view showing the lower part of the valve pin and the valve washer.

The assembly in the embodiment shown is completed by a removable valve washer 46 formed of resilient material. In relaxed state, the shape of the washer 46 shows a central opening (FIG. 2) of lesser diameter than the bottom of the groove 4. The outer diameter of the washer is larger than that of the thin seat 20 but appreciably less than the opening in the stem 12 which surrounds it.

In the final step of the assembly of the core, the pin is pressed down to extend down well below the core body. The washer 46 is then wedged on. The tapered tip 42 assists in this action. With the central opening of the washer 46 snugly engaging about the groove 44, the assembly is complete.

It will readily be seen that by simply unscrewing the core body 18 from the stem 12, the washer 26 may be inspected, cleaned, and replaced if necessary. The ready accessibility of this washer makes valves embodying the invention highly desirable especially in areas where tires are subject to operation in dirt and dust.

I claim:

1. A tire valve comprising
   (a) an elongated tubular core body having an annular upwardly-facing shoulder thereinside, the lower end being exteriorly tapered to form a thin annular valve seat, the lower end being threaded above the taper and adapted to be screwed into a tire stem,
   (b) a one-piece valve pin disposed in said core body, the pin having a head at its upper end, part of the pin extending down from the lower end of the body and formed with an annular enlargement spaced upward from the lower end and presenting an upwardly inclined guiding shoulder, and an enlarged lower end portion terminating downwardly in a tapered tip, the annular enlargement and the enlarged lower end defining a groove between them, both the enlargement and the lower end being passable through the tubular core,
   (c) a spring surrounding the pin within the body and engaging the head and the shoulder and urging the pin upward; and
   (d) a removable valve washer comprising an annulus of resilient material having its central opening in unstressed condition of lesser diameter than that of the groove and its outer diameter smaller than the surrounding opening of such stem and larger than the diameter of the thin valve seat, the washer being disposed in stretched condition in said groove, whereby the upper surface of the valve is normally held up by the spring against the seat and the valve washer is easily accessible when the body is out of such stem and the washer may thus be readily inspected, cleaned and may be removed for replacement by being stretched over said enlarged end portion.

2. A tire valve as described in claim 1 wherein the body above the threads is snugly embraced by an annular plastic gasket.

References Cited

UNITED STATES PATENTS

| | | | |
|---|---|---|---|
| 656,220 | 8/1900 | Schrader et al. | 251—351 XR |
| 2,048,843 | 7/1936 | Crowley | 137—234.5 |
| 2,904,068 | 9/1959 | St. Clair | 137—505.41 |
| 2,971,526 | 2/1961 | Boyer | 137—223 |

FOREIGN PATENTS

| | | |
|---|---|---|
| 120,345 | 9/1945 | Australia. |
| 1,036,122 | 4/1953 | France. |
| 790,720 | 2/1958 | Great Britain. |

HAROLD W. WEAKLEY, Primary Examiner

U.S. Cl. X.R.

137—315, 542